(12) United States Patent
Kim et al.

(10) Patent No.: US 10,389,001 B2
(45) Date of Patent: Aug. 20, 2019

(54) ENERGY STORAGE SYSTEM AND TEMPERATURE CONTROL METHOD FOR THE SAME

(71) Applicant: LG CHEM, LTD., Seoul (KR)

(72) Inventors: Suk-Chul Kim, Daejeon (KR); Ji-Hun Kim, Daejeon (KR); Ji-Young Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 161 days.

(21) Appl. No.: 15/624,398

(22) Filed: Jun. 15, 2017

(65) Prior Publication Data

US 2017/0365893 A1 Dec. 21, 2017

(30) Foreign Application Priority Data

Jun. 16, 2016 (KR) ........................ 10-2016-0075284

(51) Int. Cl.
*H01M 10/633* (2014.01)
*H02J 7/00* (2006.01)
(Continued)

(52) U.S. Cl.
CPC ...... *H01M 10/633* (2015.04); *G05B 19/0423* (2013.01); *H01M 10/482* (2013.01); *H01M 10/486* (2013.01); *H01M 10/6563* (2015.04); *H02J 7/0021* (2013.01); *H02J 7/0091* (2013.01); *G05B 2219/2231* (2013.01); *G05B 2219/25032* (2013.01); *H01M 2010/4271* (2013.01)

(58) Field of Classification Search
None
See application file for complete search history.

(56) References Cited

U.S. PATENT DOCUMENTS

2005/0269994 A1 12/2005 Ishishita
2013/0224537 A1* 8/2013 Choi .................. H01M 2/1077
429/71
(Continued)

FOREIGN PATENT DOCUMENTS

JP 2005-347085 A 12/2005
JP 2010-114989 A 5/2010
(Continued)

*Primary Examiner* — Daniel S Gatewood
(74) *Attorney, Agent, or Firm* — Birch, Stewart, Kolasch & Birch, LLP

(57) ABSTRACT

Disclosed is an energy storage system and a temperature control method for the same. The energy storage system includes a first battery group having a plurality of sections, which respectively have at least one battery module and at least one cooling fan; at least one first slave battery management system (BMS) coupled to the first battery group to monitor a temperature value of battery modules included in the first battery group for each section and generate first temperature information having the monitored temperature value for each section; a master BMS configured to transmit the first temperature information according to a predetermined rule; and a control unit configured to output a first control signal for adjusting a rotation speed of at least one cooling fan provided in at least one of the plurality of sections, based on the first temperature information transmitted from the master BMS.

8 Claims, 14 Drawing Sheets

(51) Int. Cl.
*H01M 10/6563* (2014.01)
*H01M 10/48* (2006.01)
*G05B 19/042* (2006.01)
*H01M 10/42* (2006.01)

(56) References Cited

U.S. PATENT DOCUMENTS

| | | |
|---|---|---|
| 2013/0253715 A1 | 9/2013 | Cho et al. |
| 2014/0091769 A1* | 4/2014 | Kim .................. H02J 7/04 320/134 |
| 2014/0121869 A1* | 5/2014 | Lee .................. B60L 11/1874 701/22 |

FOREIGN PATENT DOCUMENTS

| | | |
|---|---|---|
| KR | 10-2012-0134004 A | 12/2012 |
| KR | 10-2012-0134010 A | 12/2012 |
| KR | 10-2014-0054492 A | 5/2014 |
| KR | 10-2015-0044162 A | 4/2015 |
| KR | 10-2015-0067842 A | 6/2015 |
| KR | 10-2015-0130696 A | 11/2015 |

* cited by examiner

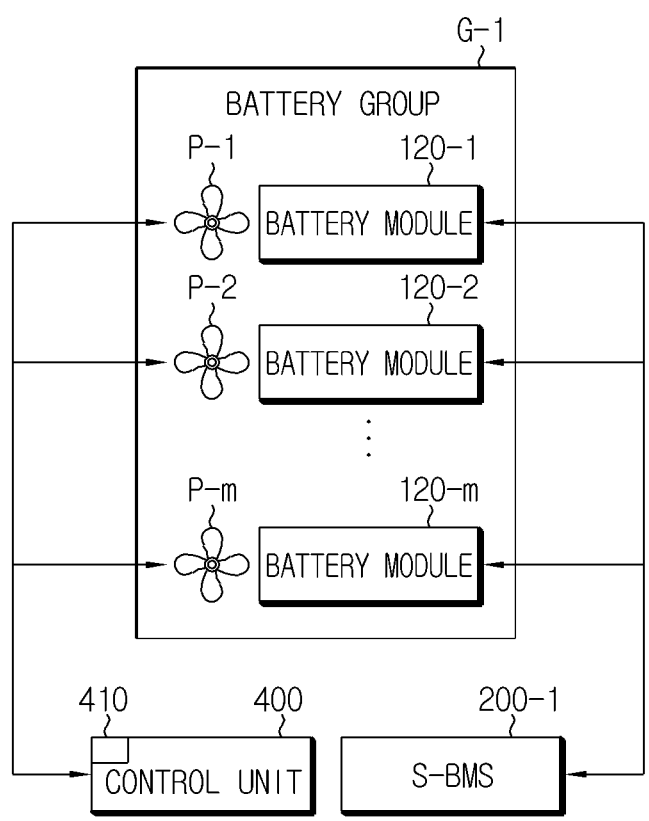

FIG. 6

| SECTION | TEMPERATURE(°C) |
|---|---|
| UPPER END PORTION | 40 |

T1a

| SECTION | TEMPERATURE(°C) |
|---|---|
| MIDDLE PORTION | 30 |

T1b

| SECTION | TEMPERATURE(°C) |
|---|---|
| LOWER END PORTION | 20 |

T1c

X1

| | SECTION | TEMPERATURE(°C) |
|---|---|---|
| T1a | UPPER END PORTION | 40 |
| T1b | MIDDLE PORTION | 30 |
| T1c | LOWER END PORTION | 20 |

Z1

| | SECTION | ROTATION SPEED (rpm) |
|---|---|---|
| Z1a | UPPER END PORTION | 500 |
| Z1b | MIDDLE PORTION | 200 |
| Z1c | LOWER END PORTION | 50 |

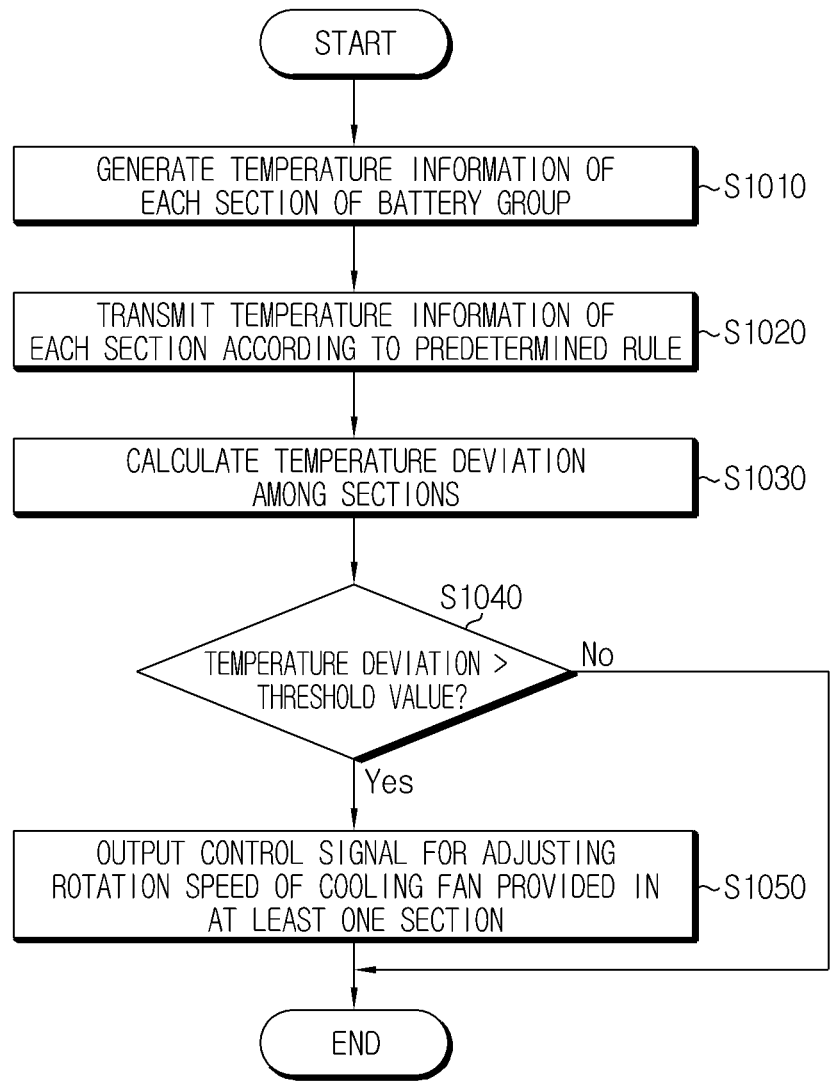

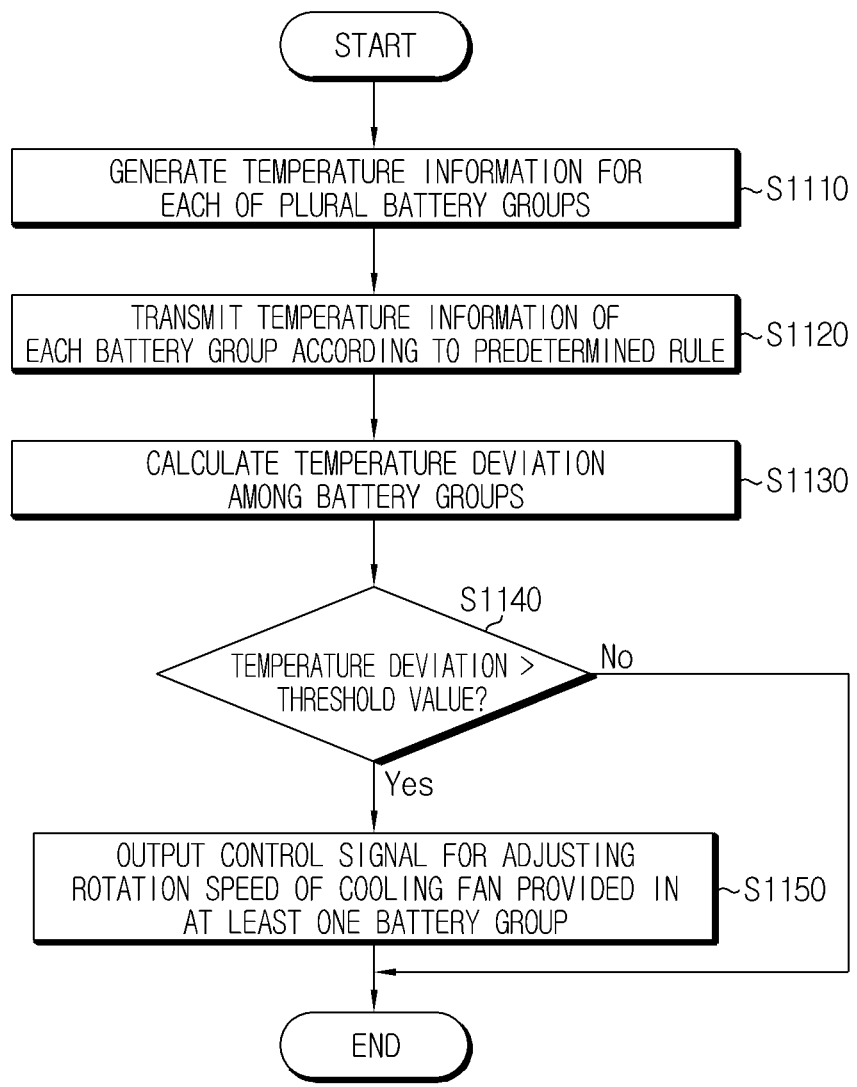

ENERGY STORAGE SYSTEM AND TEMPERATURE CONTROL METHOD FOR THE SAME

TECHNICAL FIELD

The present application claims priority to Korean Patent Application No. 10-2016-0075284 filed on Jun. 16, 2016 in the Republic of Korea, the disclosures of which are incorporated herein by reference.

The present disclosure relates to an energy storage system, and more particularly, to an energy storage system configured to lower a temperature deviation in the energy storage system and a temperature control method for the same.

BACKGROUND ART

In recent years, demand for portable electronic products such as notebook computers, video cameras, portable telephones and the like has been drastically increased and electric vehicles, storage batteries for energy storage, robots, satellites and the like have been actively developed. For this reason, high performance secondary batteries capable of repeated charge and discharge have been actively studied.

Lithium secondary batteries currently commercially available include nickel-cadmium batteries, nickel-hydrogen batteries, nickel-zinc batteries and lithium secondary batteries. Among them, the lithium secondary batteries are in the spotlight because they have almost no memory effect compared to nickel-based secondary batteries, and thus perform charge and discharge freely, have very low self-discharge rate and have high energy density.

A battery module generally has a basic structure including a plurality of unit cells connected in series or in parallel. Recently, as a need for a large-capacity structure has increased along with the increased use as an energy storage source, a battery system having a structure in which a plurality of battery modules are connected in series or in parallel has been widely used. For example, the battery system may be loaded in an energy storage system for storing and transporting a large amount of power.

The battery system may be implemented in various forms. In order to improve the efficiency in control, the battery system may be configured to be combined with a plurality of BMSs which take charge of controlling a plurality of battery modules included therein, respectively.

The existing battery system may further include a plurality of battery management systems (BMSs) for monitoring and controlling a state of a unit cell by applying an algorithm for controlling power supply to a driving load (e.g., a motor) of a battery module included therein, measuring a characteristic value such as a temperature, a current and a voltage at charging and discharging, controlling equalization of a voltage, estimating a state of charge (SOC) and the like.

If the battery system is loaded in an energy storage system or the like, the temperature of the battery modules included therein may frequently out of a proper range due to its operation (for example, charging or discharging) or external environments, which may shorten the life of the battery system or deteriorate the overall performance of the battery system. To solve this problem, a technique of cooling a battery module using a cooling fan has been disclosed. However, in this technique, it is possible to lower the temperature of the battery module, but it is impossible to lower a temperature deviation among a plurality of battery modules.

DISCLOSURE

Technical Problem

The present disclosure is designed to solve the problems of the related art, and therefore the present disclosure is directed to providing an energy storage system capable of lowering a temperature deviation of sections of each battery group provided at the energy storage system, and a temperature control method for the same.

In addition, the present disclosure is directed to lowering a temperature deviation among battery groups, when the energy storage system is provided with a plurality of battery groups.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an energy storage system, comprising: a first battery group having a plurality of sections, which respectively have at least one battery module and at least one cooling fan; at least one first slave battery management system (BMS) coupled to the first battery group to monitor a temperature value of battery modules included in the first battery group for each section and generate first temperature information having the monitored temperature value for each section; a master BMS configured to transmit the first temperature information according to a predetermined rule; and a control unit configured to output a first control signal for adjusting a rotation speed of at least one cooling fan provided in at least one of the plurality of sections, based on the first temperature information transmitted from the master BMS.

In an embodiment, the control unit may calculate a temperature deviation formed at the first battery group, based on the first temperature information transmitted from the master BMS, and the control unit may output the first control signal, based on the temperature deviation.

At this time, the temperature deviation may be a difference between a maximum temperature value and a minimum temperature value among the temperature values included in the first temperature information.

In addition, the first battery group may further include at least one battery rack. In this case, each of the battery racks may include a plurality of accommodation cases stacked in a vertical direction, and each of the accommodation cases may be provided with at least one battery module and at least one cooling fan.

In addition, the first control signal may include at least one of an acceleration command for a rotation speed of the cooling fan provided in the accommodation case having a battery module from which the maximum temperature value is monitored and a deceleration command for a rotation speed of the cooling fan provided in the accommodation case having a battery module from which the minimum temperature value is monitored.

In an embodiment, the energy storage system may further comprise a second battery group including a plurality of battery modules and a plurality of cooling fans; and at least one second slave BMS coupled to the second battery group to monitor a temperature value of each battery module included in the second battery group and generate second temperature information having the temperature value of each battery module included in the second battery group. In addition, the energy storage system may further comprise a third battery group including a plurality of battery modules and a plurality of cooling fans; and at least one third slave BMS coupled to the third battery group to monitor a temperature value of each battery module included in the third battery group and generate third temperature information having the temperature value of each battery module included in the third battery group. In this case, the master BMS may transmit the first temperature information, the second temperature information and the third temperature information to the control unit according to a predetermined rule.

In addition, the control unit may calculate a temperature deviation of the first to third battery groups, based on the first temperature information, the second temperature information and the third temperature information transmitted from the master BMS. Also, the control unit may output a second control signal for adjusting a rotation speed of at least one of the plurality of cooling fans provided in each of the first to third battery groups, based on the temperature deviation of the first to third battery groups.

In addition, the control unit may calculate a first average by averaging the temperature values included in the first temperature information, calculate a second average by averaging the temperature values included in the second temperature information, and calculate a third average by averaging the temperature values included in the third temperature information. In this case, the temperature deviation of the first to third battery groups may represent a difference between a maximum average and a minimum average of the first to third average.

In addition, the second control signal may include at least one of an acceleration command for at least one of the plurality of cooling fan included in the battery group corresponding to the maximum average and a deceleration command for at least one of the plurality of cooling fan included in the battery group corresponding to the minimum average.

In another aspect of the present disclosure, there is also provided temperature control method for an energy storage system which includes a first battery group having a plurality of battery modules and a plurality of cooling fans, a first slave BMS, a master BMS and a control unit.

The temperature control method comprises: by the first slave BMS, generating first temperature information having a temperature value of each battery module included in the first battery group; by the master BMS, transmitting the first temperature information to the control unit according to a predetermined rule; and by the control unit, outputting a first control signal for adjusting a rotation speed of at least one of the plurality of cooling fans included in the first battery group, based on the first temperature information transmitted from the master BMS.

In an embodiment, the energy storage system may further include a second battery group having a plurality of battery modules and a plurality of cooling fans, a third battery group having a plurality of battery modules and a plurality of cooling fans, at least one second slave BMS coupled to the second battery group, and at least one third slave BMS coupled to the third battery group.

In this case, the temperature control method may further comprise: by the second slave BMS, generating second temperature information having a temperature value of each battery module included in the second battery group; by the third slave BMS, generating third temperature information having a temperature value of each battery module included in the third battery group; by the master BMS, transmitting the first temperature information, the second temperature information and the third temperature information according to a predetermined rule; by the control unit, calculating a temperature deviation of the first to third battery groups, based on the first temperature information, the second temperature information and the third temperature information, transmitted from the master BMS; and by the control unit, outputting a second control signal for adjusting a rotation speed of at least one of the plurality of cooling fans included in each of the first to third battery groups, based on the temperature deviation of the first to third battery groups.

Advantageous Effects

According to at least one embodiment of the present disclosure, a temperature deviation of sections of each battery group provided at an energy storage system may be lowered. In particular, a temperature deviation of sections caused by thermal convection may be effectively suppressed.

In addition, if the energy storage system is provided with a plurality of battery groups, a temperature deviation among the battery groups may be reduced.

The effects of the present disclosure are not limited to the effects mentioned above, and other effects not mentioned herein may be clearly understood from the appended claims by those skilled in the art.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIGS. 2a and 2b are schematic diagrams showing a connection structure among a battery group, a slave BMS and a control unit, depicted in FIG. 1.

FIG. 6 is a diagram showing signals transmitted among components included in the energy storage system depicted in FIG. 5.

FIGS. 8 and 9 are diagrams which are referred to for illustrating an operation of lowering a temperature deviation of the regions depicted in FIG. 7.

FIG. 10 is a flowchart for illustrating a temperature control method for the energy storage system according to an embodiment of the present disclosure.

FIG. 11 is a flowchart for illustrating a temperature control method for the energy storage system according to another embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in the present disclosure, if it is judged that detailed explanation on a known technique or configuration may unnecessarily make the essence of the present disclosure vague, the detailed explanation will be omitted.

Throughout the specification, when a portion is referred to as "comprising" or "including" any element, it means that the portion may include other elements further, not excluding other elements unless specifically stated otherwise. Furthermore, the term "control unit" described in the specification refers to a unit that processes at least one function or operation, and may be implemented by hardware, software, or a combination of hardware and software.

Also, terms including ordinals such as first, second and the like may be used to describe various components, but the components are not limited by the terms. The terms such as first, second and the like are used only for the purpose of distinguishing one component from another.

In addition, throughout the specification, when a portion is referred to as being "connected" to another portion, it is not limited to the case that they are "directly connected", but it also includes the case where they are "indirectly connected" with another element being interposed between them.

Hereinafter, a device according to the present disclosure according to an embodiment of the present disclosure will be described.

Figure 1A:
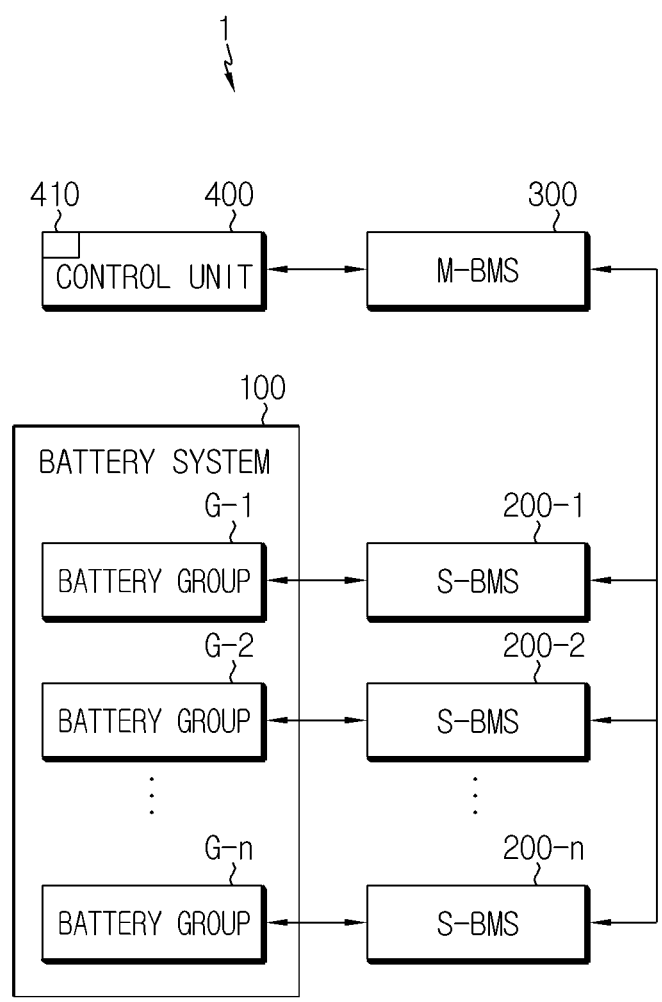
FIGS. 1a and 1b are block diagrams showing an overall functional configuration of an energy storage system according to an embodiment of the present disclosure.
Figure 1B:
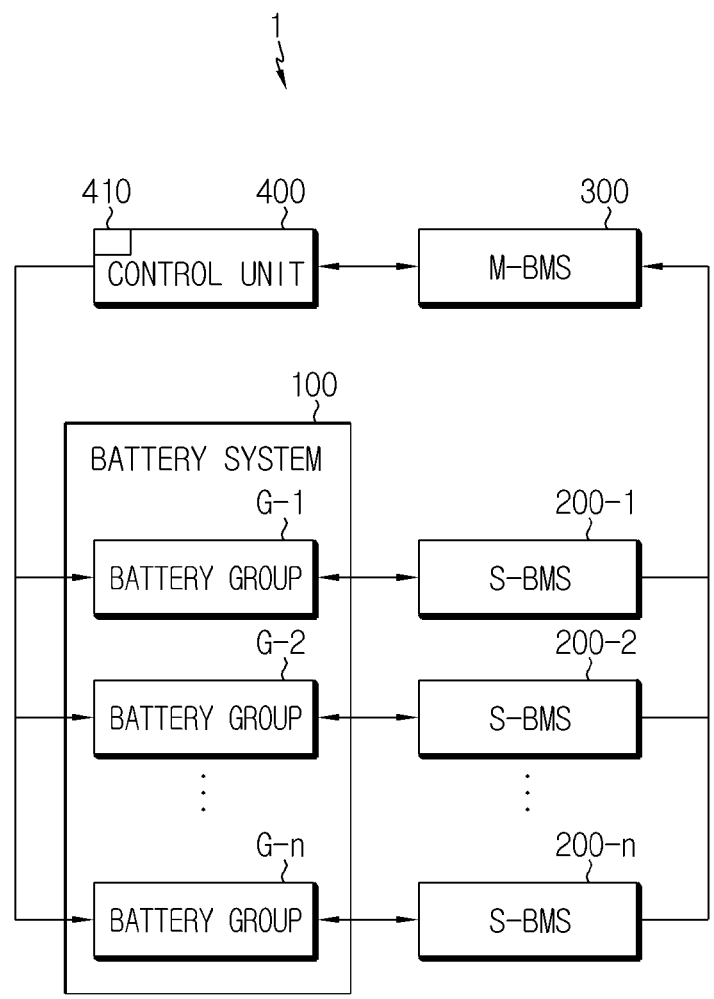

FIGS. 1a and 1b are block diagrams showing an overall functional configuration of an energy storage system 1 according to an embodiment of the present disclosure.

Referring to FIGS. 1a and 1b, the energy storage system 1 may include a battery system 100, a plurality of slave BMSs 200, a master BMS 300 and a control unit 400.

The battery system 100 may include at least one battery group G. In this case, each battery group G may include at least one battery module 120 and at least one cooling fan P.

Each slave BMS (hereinafter, referred to as an 'S-BMS') 200 may be coupled to at least one battery module 120. One or more S-BMSs 200 may be coupled to each battery group G. Also, any one battery module 120 of the battery system 100 may be coupled to only one of the plurality of S-BMSs 200. Each S-BMS 200 generates state information of a battery module 110 included in any one battery group G to which the S-BMS 200 is coupled. The state information of the battery group G is information representing an operating state of the battery module 120 included in the battery group G and may include at least one of a voltage value, a charge/discharge current value, a temperature value, an estimated charge amount and an estimated degradation degree of the battery module 120. The state information may basically include temperature information. In detail, each slave BMS may monitor a temperature value of each battery module 120 included in the battery group G to which the slave BMS is coupled. Each slave BMS may generate temperature information including the temperature value of each battery module 120 included in the battery group G to which the slave BMS is coupled.

Each S-BMS 200 may generate the state information of the battery module 120, managed by the S-BMS 200, according to a control command of a master BMS described later or according to a predetermined cycle, and then provide the state information to the master BMS through a signal line. For example, the communication network may be a controller area network (CAN).

The master BMS (hereinafter, referred to as an 'M-BMS') 300 may collect the temperature information provided from a plurality of S-BMS 200 and process each collected temperature information. In this case, the M-BMS 300 may receive temperature information from each battery group G. Preferably, when temperature information is provided from a specific slave BMS, the M-BMS 300 may allocate identification information having an identifier of the specific S-BMS 200 to the temperature information. The identifiers of the plurality of S-BMSs 200 may be stored in advance in a storage medium embedded in the M-BMS 300 or may be provided together with the temperature information from the plurality of S-BMSs 200.

The control unit 400 may output a control signal for adjusting a rotation speed of at least one of a plurality of cooling fans P included in each battery group G, based on the processed temperature information provided from the M-BMS 300. The control unit 400 may control a rotation speed of at least one of the plurality of cooling fans P included in each battery group G by means of at least one of an indirect control method and a direct control method.

Referring to FIG. 1a, in the indirect control method, the control unit 400 transmits the control signal via the M-BMS 300 and the S-BMS 200, instead of transmitting the control signal directly to the battery group G. Referring to FIG. 1b, in the direct control method, the control unit 400 may transmit the control signal directly to the battery group G, instead of transmitting the control signal via the M-BMS 300 and the S-BMS 200.

The control unit 400 described above may be implemented in hardware by using at least one of application specific integrated circuits (ASICs), digital signal processors (DSPs), digital signal processing devices (DSPDs), programmable logic devices (PLDs), field programmable gate arrays (FPGAs), micro-control units, microprocessors, and other electronic units for performing other functions. For example, the control unit 400 may be implemented in the form of a programmable logic control unit (PLC).

The control unit 400 may include a memory 410. The memory 410 may store various data and commands required for the overall operation in relation to the temperature control of the energy storage system 1. For example, the memory 410 may include a storage medium of at least one of a flash memory type, a hard disk type, a solid state disk (SSD) type, a silicon disk drive (SDD) type, a multimedia card micro type, a random access memory (RAM) type, a static random access memory (SRAM) type, a read-only memory (ROM) type, an electrically erasable programmable read-only memory (EEPROM) type, and a programmable read-only memory (PROM).

The memory 410 may temporarily or permanently store information processed by components directly or indirectly connected to the control unit 400 or associated data.

Figure 2A:
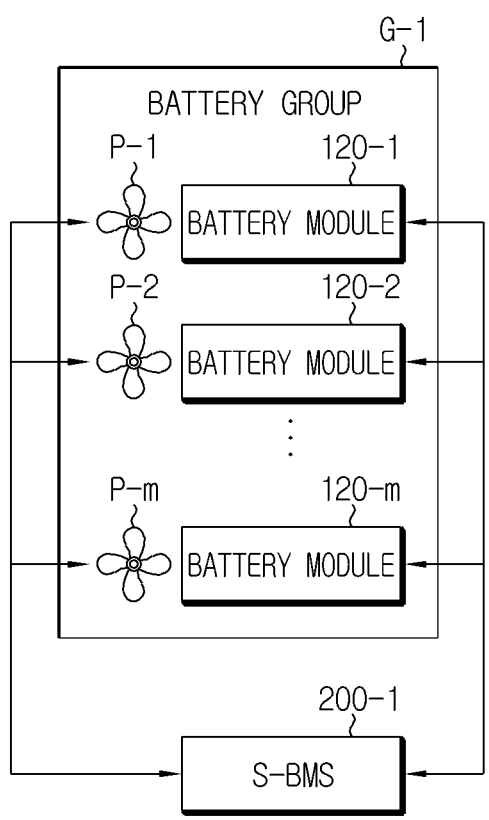

FIGS. 2a and 2b are schematic diagrams showing a connection structure among the battery group G, the S-BMS 200 and the control unit 400, depicted in FIG. 1. For better understanding, the connection structure will be explained based on the first battery group G.

Referring to FIGS. 2a and 2b, any one battery group G-1 included in the energy storage system 1 includes at least one battery module 120 and at least one cooling fan P. Preferably, at least one cooling fan P for cooling each battery module 120 included in the battery group G-1 may be provided. As shown in the figures, it is assumed that the first battery group G-1 includes an m number of battery modules 120-1 to 120-*m* and an m number of cooling fans P-1 to P-*m*. In this case, the m number of cooling fans P-1 to P-m may be provided for individually cooling the m number of battery modules 120-1 to 120-*m* in order.

FIG. 2a exemplarily shows a connection structure for selectively adjusting rotation speeds of the plurality of cooling fans P-1 to P-m by means of the indirect control method according to FIG. 1. Referring to FIG. 2a, the S-BMS 200-1 coupled to the first battery group G-1 may be operatively connected not only to the plurality of battery modules 120-1 to 120-*m* but also the plurality of cooling fans P-1 to Pm through signal lines or the like. The S-BMS 200-1 may accelerate or decelerate a rotation speed of at least one of the plurality of cooling fans P-1 to Pm in response to the control signal transmitted via the M-BMS 300 from the control unit 400.

FIG. 2b exemplarily shows a connection structure for selectively adjusting rotation speeds of the plurality of cooling fans P-1 to P-m by means of the direct control method according to FIG. 1b. Referring to FIG. 2b, the S-BMS 200-1 coupled to the first battery group G-1 may be operatively coupled to the plurality of battery modules 120-1 to 120-*m* through signal lines or the like, and also the control unit 400 may be operatively coupled to the plurality of cooling fans P-1 to Pm through separate signal lines or the like. In other words, the S-BMS 200-1 may take charge of collecting the state information of the plurality of battery modules 120 and may not take charge of relaying the control signals output from the control unit 400. At this time, depending on the control signal transmitted directly from the control unit 400, a rotation speed of at least one of the plurality of cooling fans P-1 to P-m may be adjusted. Meanwhile, even though FIGS. 2a and 2b depict a single battery group G-1 and a single S-BMS 200-1, the remaining battery groups G-2 to G-n and S-BMS 200-2 to 200 may also be implemented in the same way.

In FIGS. 1a to 2b, it is depicted that one of components is connected to another component through at least one connection line. However, this is merely an example, and it should not be limited to the case that components included in the energy storage system 1 are connected through the connection lines shown in FIGS. 1a to 2b.

In addition, the energy storage system 1 depicted in FIGS. 1a and 1b may be configured to have fewer components than the components listed above or to further include additional components not listed above. For example, the energy storage system 1 may further include an electric switchboard or the like, which is coupled to the battery system 100.

Figure 3A:
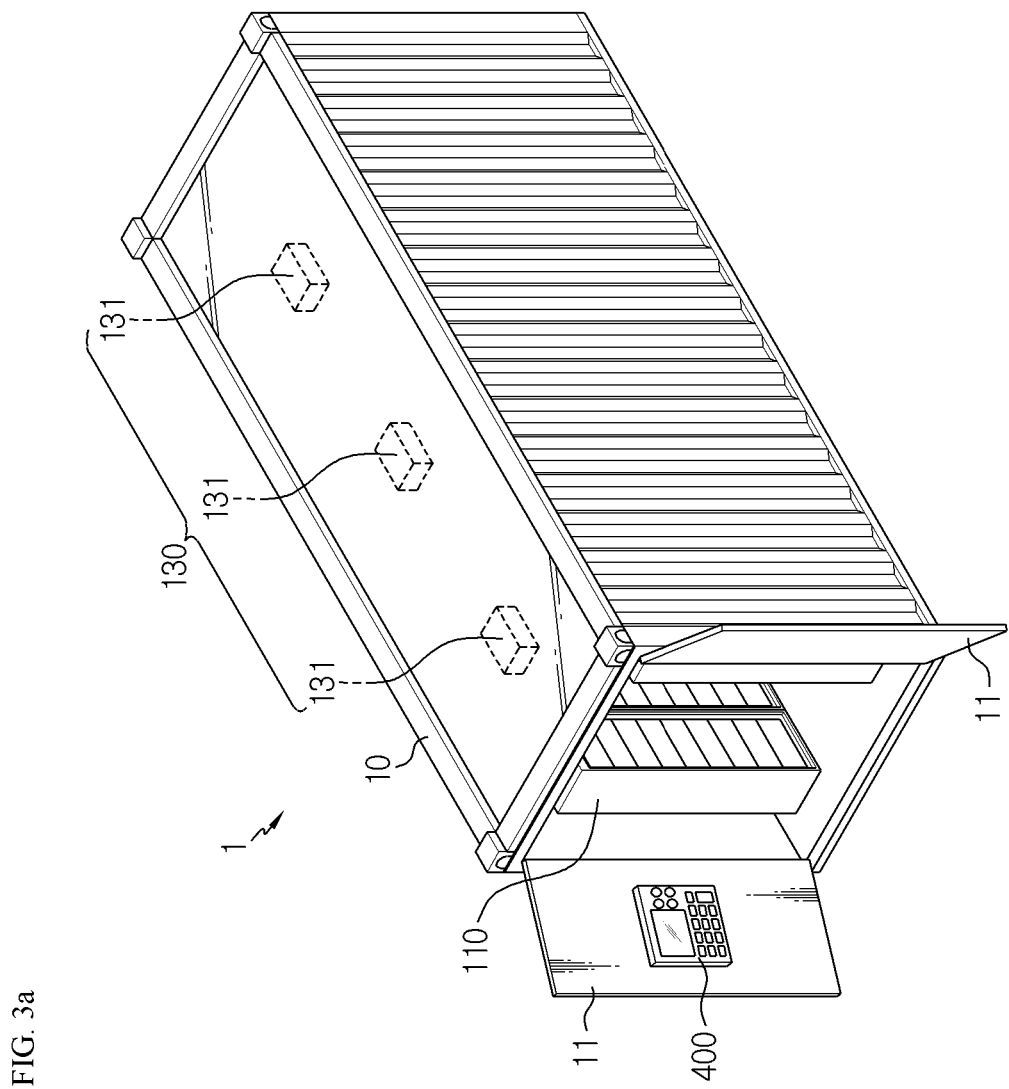
FIGS. 3a to 3c are diagrams showing that the energy storage system according to an embodiment of the present disclosure is implemented in a container form.
Figure 3B:
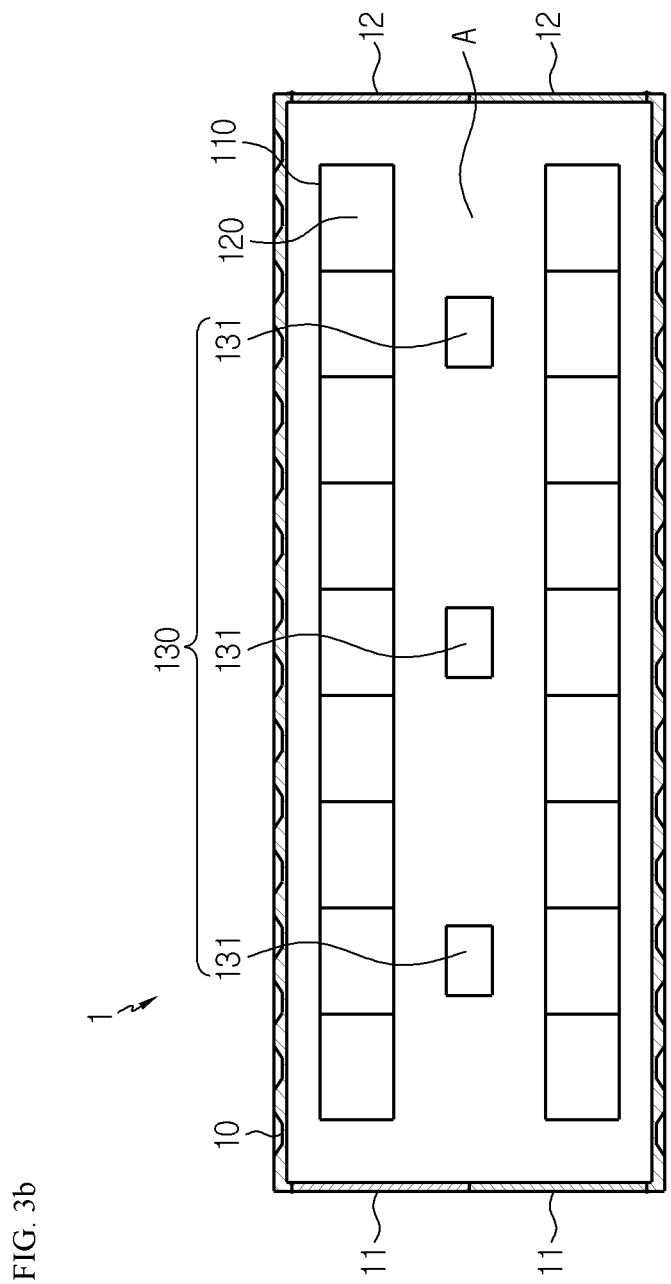
Figure 3C:
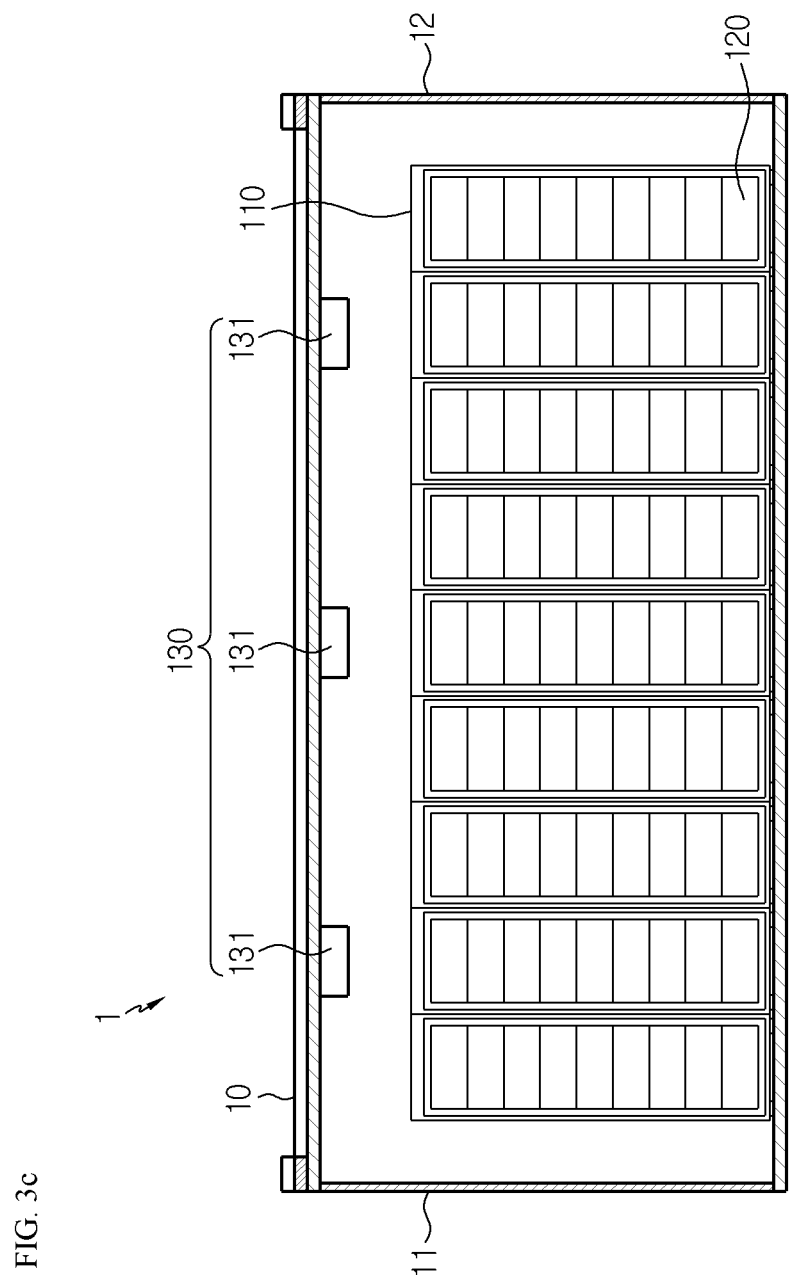
Figure 4:
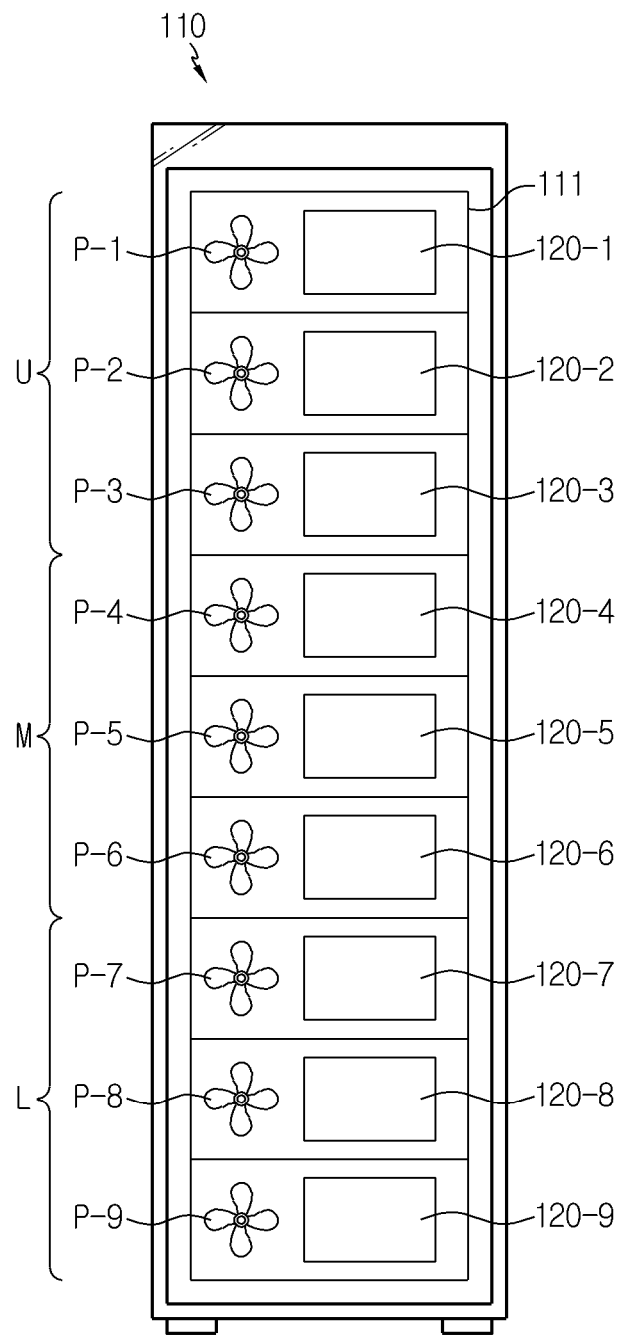
FIG. 4 is a schematic diagram showing a configuration of a battery rack, depicted in FIG. 3.

FIGS. 3a to 3c are diagrams showing the energy storage system 1 according to an embodiment of the present disclosure is implemented in a container form, and FIG. 4 is a schematic diagram showing a configuration of the battery rack 110 of FIG. 3. In detail, FIG. 3a is a perspective view of the energy storage system 1, FIG. 3b is a plane view of the energy storage system 1 of FIG. 3a, and FIG. 3c is a side sectional view of the energy storage system 1 of FIG. 3a. For convenience of explanation, the S-BMS 200 and the M-BMS 300 described above with reference to FIGS. 1a to 2b are omitted.

Referring to FIGS. 3a to 3c, the battery system 100 and the control unit 400 may be accommodated in a housing 10 of the energy storage system 1. On occasions, the housing 10 may be configured to further accommodate an HVAC system 130 having at least one air-conditioning device 131.

The housing 10 gives an inner space capable of accommodating other components of the energy storage system 1 and plays a role of preventing the other components from being directly exposed to the outside. The housing 10 may also be called a 'container', depending on the field where the energy storage system 1 is used. A door may be provided at a portion of the housing 10 so that a user or the battery rack 110 may move in or out. For example, as shown in the figures, doors 11 and 12 may be provided at one side and the other side of the housing 10 in a longitudinal direction, respectively.

Generally, the housing 10 may be fabricated in a substantially rectangular parallelepiped shape, and each side of the housing 10 may be integrally formed or configured to be separable into at least two parts.

The battery system 100 accommodated in the inner space of the housing 10 may further include at least one battery rack 110 for loading a plurality of battery modules 120.

Each battery module 120 may be implemented as a group of a plurality of unit cells. In this case, the kind of the unit cell is not specially limited and may be a rechargeable secondary battery such as a lithium ion battery, a lithium polymer battery, a nickel-cadmium battery, a nickel-hydrogen battery, or a nickel-zinc battery. It is obvious that the number of unit cells included in the battery module 120 may vary depending on the output voltage and capacity demanded for the battery module 120.

A plurality of battery modules 120 may be accommodated in each battery rack 110. Preferably, each battery rack 110 may include a plurality of accommodation cases 111 stacked in a vertical direction. At this time, each accommodation case 111 may include at least one battery module 120 and at least one cooling fan P. For example, each accommodation case 111 may include a single battery module 120 and a single cooling fan P, respectively. At this time, any one battery module 120 accommodated in the battery rack 110 and another battery module 120 may have different storage heights.

If a plurality of battery modules 120 are included in the battery system 100, the battery modules 120 may be individually loaded according to the shape and position of the battery rack 110 and then connected in parallel or in series through cables or the like. For example, a battery module 120 accommodated in any one battery rack 110 may be connected to another battery module 120 accommodated in the same battery rack 110 or connected to another battery module 120 accommodated in another battery rack 110. The number of battery racks 110 may be suitably determined according to the number of battery modules 120 included in the battery system 100.

Referring to FIGS. 3b and 3c, the plurality of battery racks 110 may be arranged in a predetermined order at both sides along the longitudinal direction of the housing 10, with a passage area A being interposed therebetween. Hereinafter, as shown in FIG. 3B, it is assumed that eighteen battery racks 110 are included in the battery system 100 in total, and nine cells are arranged at both sides along the longitudinal direction of the housing 10, respectively, based on the passage area A.

The S-BMS 200 for controlling the charging and discharging operations of the battery module 120 accommodated in each battery rack 110 may be coupled to the battery rack 110. At this time, the S-BMS 200 may be included in the battery module 120, or may be manufactured separately from the battery module 120 and then connected thereto through a signal line or the like. The S-BMS 200 may be provided one by one for each battery module 120, or for each battery group G having two or more battery modules 120. In the present disclosure, it is assumed that a single S-BMS 200 is coupled to each battery rack 110. The S-BMS 200 may generate temperature information representing a temperature value or a representative value (for example, an average, or a median value) of each battery module 120 provided in the battery rack 110 coupled thereto, in real time or periodically, based on data provided from a temperature sensor embedded in the battery module 120.

Meanwhile, if the battery system 100 is provided in the inner space of the housing 10, a temperature deviation may occur among the battery modules 120 included in the battery system 100 as described above. This temperature deviation may be caused by the nature of the battery module 120, for example a difference in state of charge (SOC) among a plurality of unit cells of each battery module 120, a charging/discharging operation, a difference in insulation resistance between electrodes, a swelling phenomenon, a difference in degradation degrees among the unit cells. Alternatively, the temperature deviation may be caused by an external environment out of the battery module 120, such as an operating environment where the energy storage system 1 is installed, or thermal convection of the inner space of the housing 10. For example, in the housing 10, an air having a relatively high temperature due to the heat emitted from the battery module 120 moves upwards, and the temperature of a battery module 120 loaded at a higher stage may be higher than the temperature of a battery module 120 loaded at a lower stage in the same battery rack 110.

The HVAC system 130 takes charge of heating, cooling or ventilating the inner space of the housing 10 at least partially by using a cooling medium (for example, air). The HVAC system 130 includes at least one air-conditioning device 131.

If the HVAC system 130 includes a plurality of air-conditioning devices 131, any one air-conditioning device 131 may be operatively coupled to at least one of the other air-conditioning devices 131 directly or indirectly. For example, any one air-conditioning device 131 may exchange air-conditioning information with another air-conditioning device 131 by means of a predetermined communication method. In addition, each air-conditioning device 131 may be installed with approximately the same gap from other air-conditioning devices 131 adjacent thereto in the longitudinal, width or height directions of the housing 10. For example, the air-conditioning device 131 may be mounted on the roof of the housing 10 as shown in FIGS. 3a to 3c. Preferably, the air-conditioning device 131 may be disposed in a region that is vertically opposite the passage area A, among the entire area of the roof of the housing 10. However, the locations of the air-conditioning devices 131 mounted at the housing 10 and the arrangements of the air-conditioning devices 131 are not limited to the case shown in FIGS. 3a to 3c.

Referring to FIG. 4, each battery rack 110 may include a plurality of accommodation cases 111 and a plurality of cooling fans P. The plurality of accommodation cases 111 may be arranged up and down to stack the battery modules 120 in a vertical direction. The number of accommodation cases 111 included in each battery rack 110 may vary as desired depending on the field in which the energy storage system 1 is used.

Hereinafter, it is assumed that each battery rack 110 includes nine accommodation cases 111 and nine cooling fans P, and one battery module 120 is accommodated by each accommodation case 111. In addition, one cooling fan P may be provided for each accommodation case 111. Moreover, each battery rack 110 may be divided into a plurality of sections having at least an upper end portion U and a lower end portion L. For example, each battery pack may be divided into three sections, composed of an upper end portion U, a middle portion M and a lower end portion L.

Hereinafter, it is assumed that three battery modules 120-1 to 120-3 and three cooling fans P-1 to P-3 provided at the upper side of the battery rack 110 belong to the upper end portion U, three battery modules 120-7 to 120-9 and three cooling fans P-7 to P-9 provided at the lower side of the battery rack 110 belong to the lower end portion L, and the remaining three battery modules 120-4 to 120-6 and three cooling fans P-4 to P-6 belong to the middle portion M.

Figure 5:
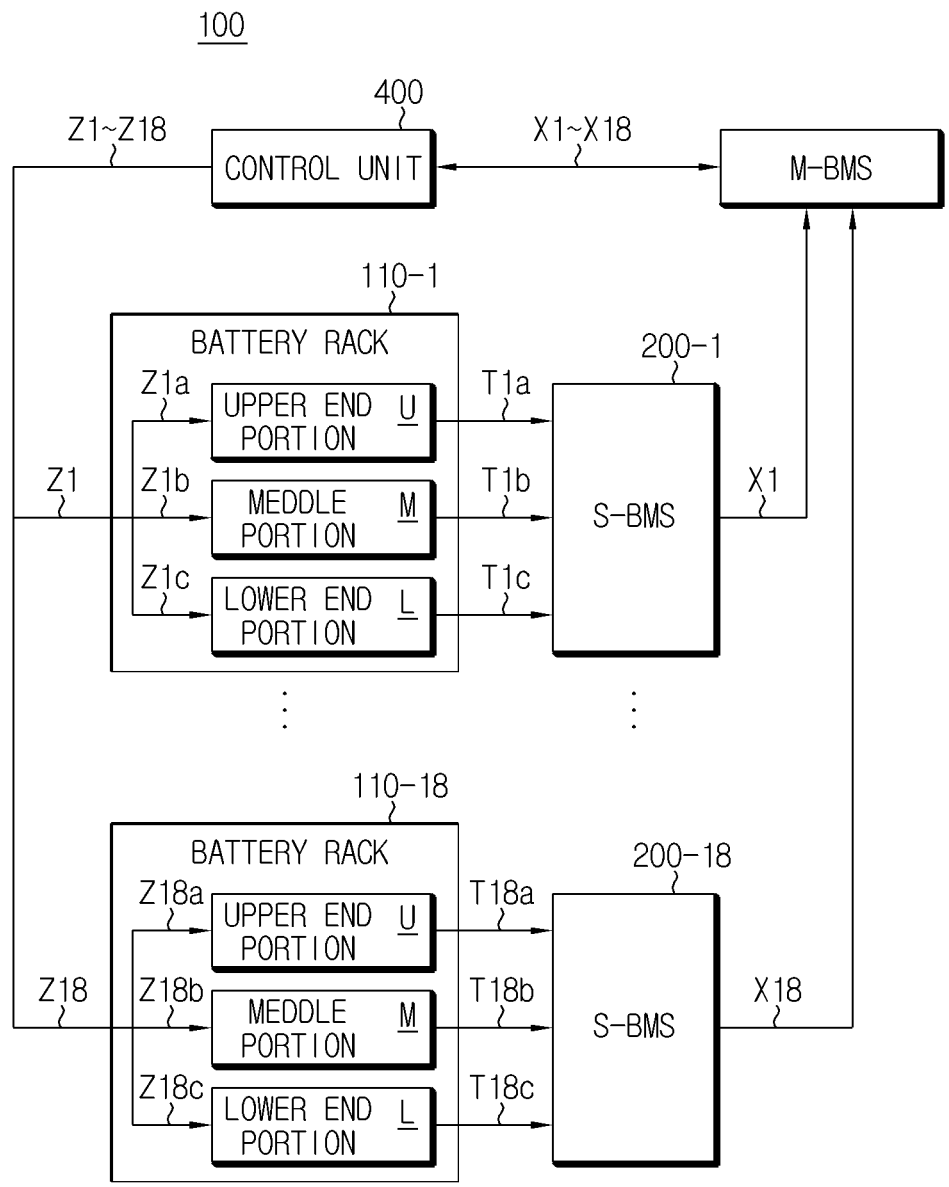
FIG. 5 is a diagram which is referred to for illustrating an operation of lowering a temperature deviation of each battery group G by the energy storage system depicted in FIGS. 3a and 3b.

FIG. 5 is a diagram which is referred to for illustrating an operation of lowering a temperature deviation of each battery group G by the energy storage system 1 depicted in FIGS. 3a and 3b, and FIG. 6 is a diagram showing signals transmitted among components included in the energy storage system 1 of FIG. 5. In FIGS. 5 and 6, for convenience of explanation, it is assumed that the energy storage system 1 controls the cooling fan P by means of the direct control method, and each battery group G is composed of a single battery rack 110. For example, the battery rack 110 and the battery group G may be the same.

Referring to FIGS. 5 and 6, the first S-BMS 200-1 monitors a temperature value of the battery module 120 included in the first battery rack 110-1 coupled thereto. Preferably, the first S-BMS 200-1 may monitor a temperature value of the battery module 120 included in the first battery rack 110-1 coupled thereto for each section U, M, L.

As shown in the figures, the first S-BMS 200-1 may monitor a temperature value of each battery module 120 included in the first battery rack 110-1, based on a signal provided from the battery module 120 included in the upper end portion U of the first battery rack 110-1, a signal provided from the battery module 120 included in the middle portion M, and a signal provided from the battery module 120 included in the end portion L.

In FIG. 6, the temperature value indicated by a signal T1a may be an average of temperature values of three battery modules 120 belonging to the upper end portion U of the first battery rack 110-1, the temperature value indicated by a signal T1b may be an average of temperature values of three battery modules 120 belonging to the middle portion M of the first battery rack 110, and the temperature value indicated by a signal T1c may be an average of temperature values of three battery modules 120 belonging to the lower end portion L of the first battery rack 110-1. However, this is just an example, and instead of the average, the temperature value of each of the battery modules 120 included in the first battery rack 110-1 may also be contained in the signals T1a to T1c.

Also, the first S-BMS 200-1 may generate first temperature information X1 corresponding to the monitoring result for the plurality of battery modules 120 included in the first battery rack 110-1 and transmit the generated first temperature information X1 to the M-BMS 300. It is obvious to those skilled in the art that the second to the eighteenth S-BMSs 200-1 to 200-18 may also generate temperature information signals X2 to X18 for each of the second to eighteenth battery racks 110-2 to 100-18.

The M-BMS 300 may collect the temperature information X1 to X18 provided from the first to eighteenth S-BMSs 200-1 to 200-18 and transmit the collected temperature information X1 to X18 to the control unit 400 according to a predetermined rule. For example, the M-BMS 300 may sequentially transmit the first to eighteenth temperature information X1 to X18 at regular intervals. In an embodiment, the M-BMS 300 may allocate inherent identification information to each temperature information and then send the temperature information to the control unit 400.

Preferably, the M-BMS 300 may allocate an identifier associated with the first S-BMS 200 to the first temperature information X1. For example, the control unit 400 may refer to the identifier allocated to the first temperature information X1 to easily determine that the first temperature information X1 is monitored by the first battery rack 110-1, and then output a control signal for selectively operating at least a part of the plurality of cooling fans P provided at the first battery rack 110-1 based on the first temperature information X1.

Based on the temperature information X1 to X18 provided from the first to eighteenth S-BMSs 200-1 to 200-18, the control unit 400 may output control signals Z1 to Z18 for selective driving the cooling fans P provided at the first to eighteenth battery racks 110-1 to 110-18. In detail, the control unit 400 may calculate a temperature deviation formed at each battery rack 110, based on the temperature information X1 to X18.

The control unit 400 may calculate the temperature deviation formed at the first battery rack 110-1, based on the first temperature information X1. Preferably, the control unit 400 may calculate a temperature deviation among three sectors U, M, L of the first battery rack 110-1. Referring to FIG. 6, the temperature deviation formed at the first battery rack 110-1 may be 20° C., which is a difference between a maximum temperature value and a minimum temperature value among the temperature values of the sections included in the first temperature information X1.

If the temperature deviation formed at a specific the battery rack 110 exceeds a first threshold value (for example, 10° C.), the control unit 400 may output a control signal for adjusting a speed of at least one cooling fan P included in the corresponding battery rack 110. Preferably, the control unit 400 may output a control signal for driving the plurality of cooling fans P included in the same battery rack 110 for each of three sections U, M, L.

For example, for the first battery rack 110-1 in which a temperature deviation exceeding the first threshold value is generated, the control unit 400 may output a first control signal Z1, which includes an acceleration command Z1a for the rotation speed of three cooling fans P belonging to the upper end portion U from which the maximum temperature value is monitored and a deceleration command Z1c for the rotation speed of three cooling fans P belonging to the lower end portion L from which the minimum temperature value is monitored. At this time, the first control signal Z1 may further include a maintenance command Z1b for the rotation speed of three cooling fans P belonging to the middle portion M.

Three cooling fans P belonging to the upper end portion U may increase their rotation speed to 500 rpm in response to the acceleration command Z1a. In addition, three cooling fans P belonging to the middle portion M may maintain their rotation speed at 200 rpm in response to the acceleration command Z1b. Moreover, three cooling fans P belonging to the lower end portion L may decrease their rotation speed to 50 rpm in response to the acceleration command Z1c.

According to FIGS. 5 and 6, if a temperature deviation exceeding the first threshold value is generated in a direction perpendicular to the ground among the sections of a specific battery group G included in the battery system 100, the control unit 400 may individually control the rotation speeds of the plurality of cooling fan P to reduce the temperature deviation quickly and effectively. As a result, the temperature imbalance between the upper part and the lower part due to the thermal convection in the case 10 may be suppressed.

Figure 7:
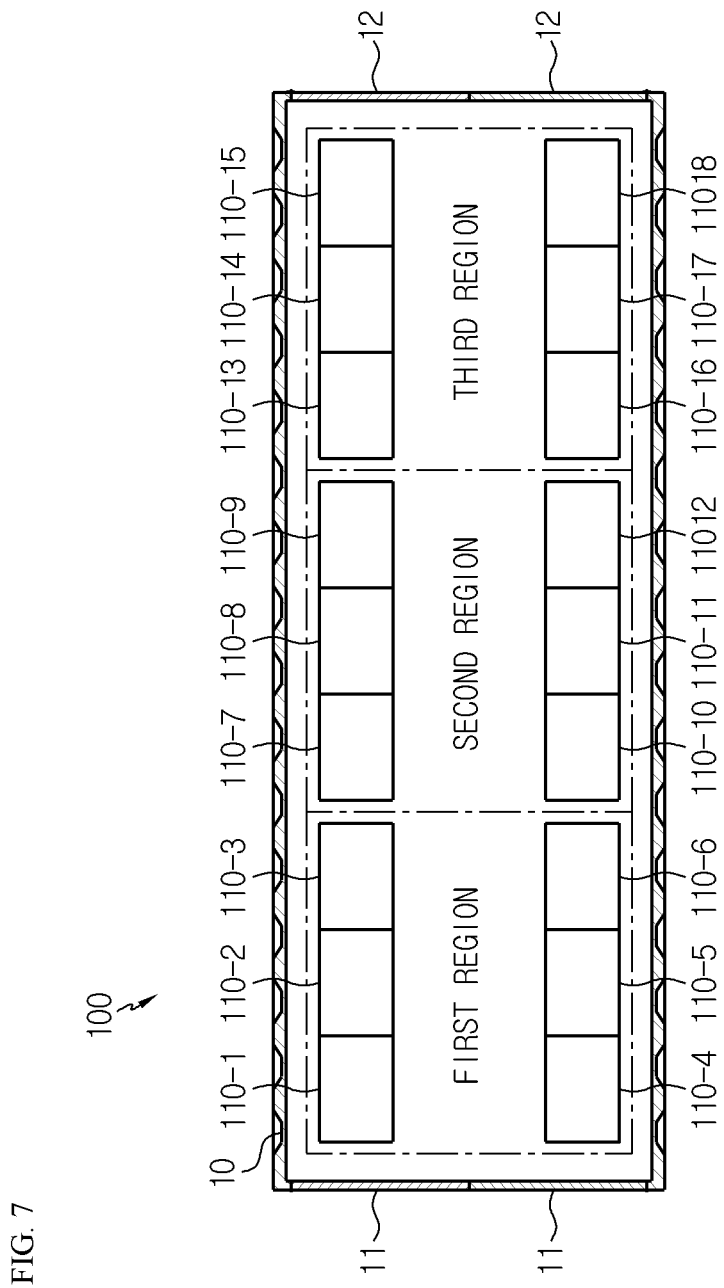
FIG. 7 is a plane view showing that a plurality of battery racks are disposed at different regions of a case in the energy storage system according to an embodiment of the present disclosure.
Figure 8:
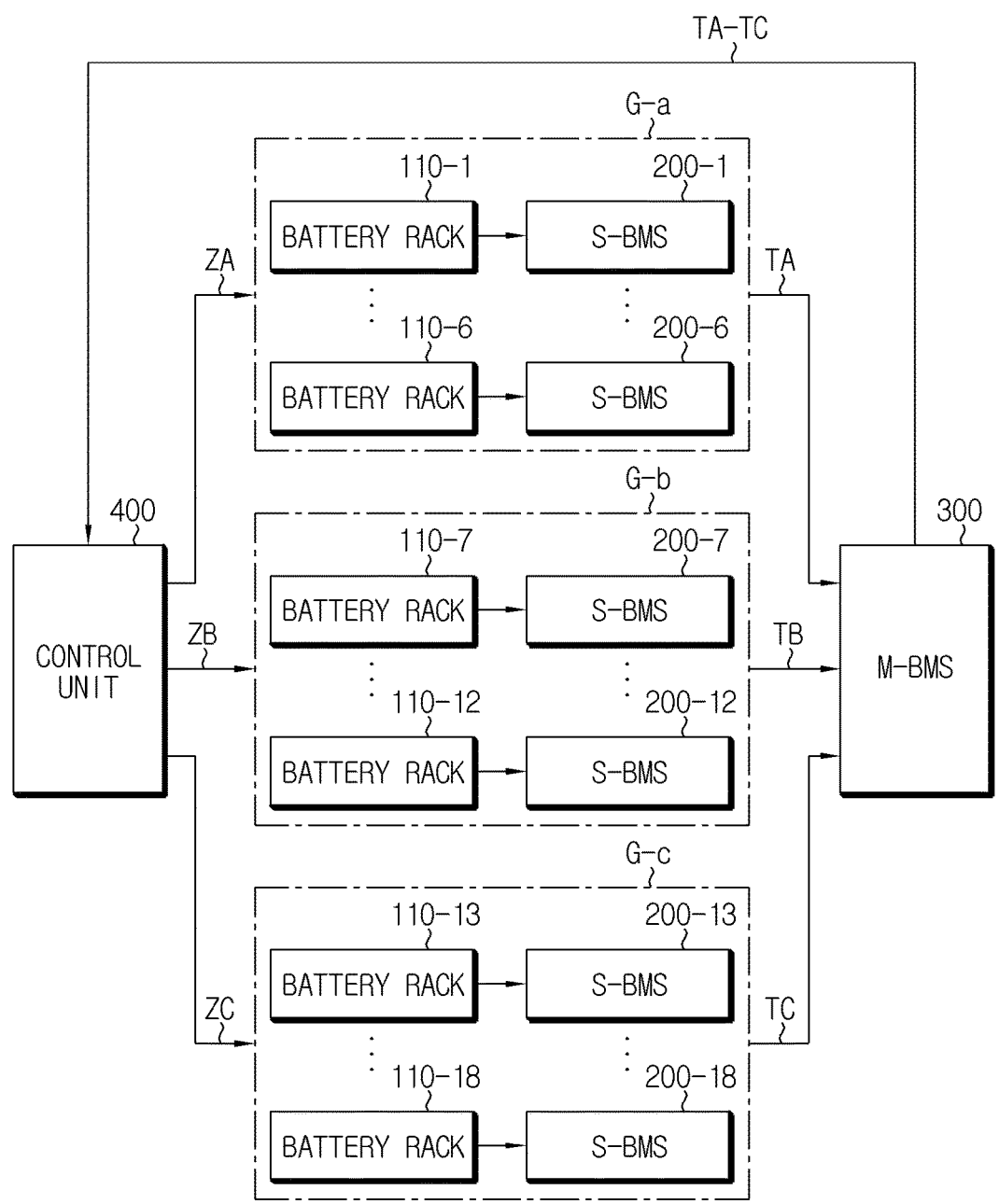

FIG. 7 is a plane view showing that a plurality of battery racks 110 are disposed at different regions of the case 111 in the energy storage system 1 according to an embodiment of the present disclosure, and FIGS. 8 and 9 are diagrams which are referred to for illustrating an operation of lowering a temperature deviation of the regions depicted in FIG. 7. For convenience of explanation, FIG. 7 depicts that eighteen battery racks 110-1 to 110-18 are arranged in a predetermined shape in the inner space of the housing 10 as described above. Alternatively, it should be understood that the S-BMS 200, the M-BMS 300 and the control unit 400 are not depicted in FIG. 7.

Referring to FIG. 7, the housing 10 may be divided into a plurality of regions along the longitudinal direction from the left door 11 to the right door 12. As shown in the figure, the inner space of the housing 10 may be divided into first to third regions, among which the first region is a region closest to the left door 11, the third region is a region closest to the right door 12, and the second region is a region between the first region and the third region. It is assumed that six battery racks 110 are arranged in each region. In this case, all battery racks 110 disposed in the same region may configure a single battery group G.

In other words, in FIG. 7, the first to sixth battery racks 110-1 to 110-6 disposed in the first region constitute a first battery group G-a, the seventh to twelfth battery racks 110-7 to 110-12 disposed in the second region constitute a second battery group G-b, and the thirteenth to eighteenth battery racks 110-13 to 110-18 disposed in the third region constitute a third battery group G-c. Here, it is obvious to those skilled in the art that the number of battery racks 110 disposed in each region or each battery group G may not be equal to one another but may be determined in various ways.

Meanwhile, a temperature deviation may occur among the regions of housing 10. For example, even though all battery modules 120 in the housing 10 are charged or discharged identically, the battery module 120 disposed in the second region may have a relatively higher temperature due to the heat emitted from the battery modules 120 disposed in the first region and the third region. For example, as shown in the figures, the doors 11 and 12 may be provided at both sides of the housing 10, and depending on whether the doors 11 and 12 are opened or closed, the battery modules 120 disposed in the first region and the third region may be significantly influenced by the external temperature in comparison to the battery module 120 disposed in the second region. Due to various other causes, a temperature deviation can occur among the first and third regions.

Referring to FIG. 8, the M-BMS 300 receives the temperature information TA from the first to sixth S-BMSs 200-1 to 200-6 disposed in the first region, temperature information TB from the seventh to twelfth S-BMSs 200-7 to 200-12, and temperature information TC from the thirteenth to eighteenth S-BMSs 200-13 to 200-18 disposed in the third region.

The temperature information TA may include the temperature values of the plurality of battery modules 120 included in the first to sixth battery racks 110-1 to 110-6 disposed in the first region. The temperature information TB may include the temperature values of the plurality of battery modules 120 included in the seventh to twelfth battery racks 110-7 to 110-12 disposed in the second region. The temperature information TC may include temperature values of the plurality of battery modules 120 included in the thirteenth to eighteenth battery racks 110-13 to 110-18 disposed in the third region.

If the number of battery modules 120 accommodated by each battery rack 110 is nine as described above, it will be easily understood by those skilled in the art that each of the temperature information TA, TB, and TC may include 54 (=6×9) temperature values.

The M-BMS 300 may transmit the temperature information TA, TB, TC provided for each region to the control unit 400 according to a predetermined rule. For example, the M-BMS 300 may transmit the temperature information in the order of TA→TB→TC at every predetermined cycle.

The control unit 400 may calculate the temperature deviation among the first to third battery groups G-a to G-c, based on the first temperature information TA, the second temperature information TB and the third temperature information TC transmitted from the M-BMS 300. In other words, the control unit 400 may analyze how much temperature deviation occurs among the first and third regions.

In detail, the control unit 400 may calculate a first average by averaging the temperature values included in the first temperature information TA. Simultaneously or separately, the control unit 400 may calculate a second average by averaging the temperature values included in the second temperature information TB. Simultaneously or separately, the control unit 400 may calculate a third average by averaging the temperature values included in the third temperature information TC. The first to third averages may be values representing the temperatures of the first to third battery groups G-a to G-c, respectively.

Next, the control unit 400 may calculate a difference between the maximum average and minimum average of the first to third averages. At this time, the difference between the maximum average and the minimum average may be the temperature deviation among the first to third battery groups G-a to G-c.

The control unit 400 may output a control signal for selectively driving the plurality of cooling fans P included in the first to third battery groups G-a to G-c, based on the temperature deviation among the first to third battery groups G-a to G-c. In other words, the control unit 400 may output a control signal for adjusting a rotation speed of at least one of the plurality of cooling fans P provided in at least one of the first to third battery groups G-a to G-c.

Preferably, the control unit 400 may output a control signal, which includes at least one of an acceleration command for at least one of the plurality of cooling fans P provided in the battery group G corresponding to the maximum average and a deceleration command for at least one of the plurality of cooling fans P provided in the battery group G corresponding to the minimum average.

For example, it is assumed that the first average is 30° C., the second average is 52° C., and the third average is 45° C. In this case, a maximum temperature deviation among the first and third regions calculated by the control unit 400 will be 22° C. (=52° C.−30° C.). If the temperature deviation among the first and third regions exceeds a given second threshold value (for example, 15° C.), the control unit 400 may output a control signal, which includes at least one of an acceleration command for a rotation speed of at least one cooling fan P included in the battery group G-b from which the maximum average is calculated and an deceleration command for a rotation speed of at least one cooling fan P included in the battery group G-a from which the minimum average is calculated. For example, the control unit 400 may output a control signal instructing to drive the plurality of cooling fans P disposed in the same region at the same rotation speed.

Referring to FIG. 9, the control unit 400 may output a control signal, which includes an acceleration command ZB for the rotation speeds of all cooling fans P belonging to the second battery group G-b having the maximum average and a deceleration command ZA for the rotation speeds of all cooling fans P belonging to the first battery group G-a having the minimum average. At this time, the control signal may further include a command ZC for adjusting the rotation speeds of all cooling fans P belonging to the third battery group G-c.

All the cooling fans P belonging to the first battery group G-a may adjust their rotation speeds to 400 rpm in response to the acceleration command ZA. All the cooling fans P belonging to the second battery group G-b may adjust their rotation speeds to 700 rpm in response to the acceleration command ZB. All the cooling fans P belonging to the third battery group G-c may adjust their rotation speeds to 600 rpm in response to the acceleration command ZC.

FIG. 10 is a flowchart for illustrating a temperature control method for the energy storage system 1 according to an embodiment of the present disclosure.

Referring to FIG. 10, in Step S1010, the S-BMS 200 generates temperature information for each section of each battery group G disposed in the housing 10. For example, each battery group G may be composed of three sections, classified into an upper end portion U, a middle portion M and a lower end portion L based on the height, and each section may be provided with at least one battery module 120. In addition, each battery group G may be coupled to at least one S-BMS 200 and include a plurality of battery modules 120 and a plurality of cooling fans P. In this case, each S-BMS 200 may monitor the temperature value of each battery module 120 included in each section of the battery group G coupled thereto and generate temperature information including the monitored temperature value.

In Step S1020, the M-BMS 300 may transmit the temperature information for each section, generated by the S-BMS 200, to the control unit 400 according to a predetermined rule. In Step S1030, the control unit 400 may calculate the temperature deviation among the sections of the same battery group G, based on the temperature information of each section transmitted from the M-BMS 300.

In Step S1040, the control unit 400 may determine whether the calculated temperature deviation is greater than a predetermined threshold value. If the result of Step S1040 is 'YES', Step S1050 may be performed.

In Step S1050, the control unit 400 may output a control signal for adjusting the rotation speed of the cooling fan P provided in at least one section among the plurality of sections. The control signal output from the control unit 400 may be transmitted directly or indirectly to the cooling fan P included in at least one section of the battery group G.

FIG. 11 is a flowchart for illustrating a temperature control method for the energy storage system 1 according to another embodiment of the present disclosure.

Referring to FIG. 11, in Step S1110, the plurality of S-BMSs 200 included in the energy storage system 1 may generate temperature information for the plurality of battery groups G, respectively. The plurality of battery groups G may be classified into regions of the housing 10. At this time, each battery group G may be coupled to at least one S-BMS 200 and have a plurality of battery modules 120 and a plurality of cooling fans P. In this case, each S-BMS 200 may monitor the temperature value of the battery module 120 included in the battery group G coupled thereto and generate temperature information including the monitored temperature value. In other words, the temperature information may be generated for each battery group G.

In Step S1120, the M-BMS 300 may transmit the temperature information of the battery group G, generated by the plurality of S-BMSs 200, to the control unit 400 according to a predetermined rule. In Step S1130, the control unit 400 may calculate a temperature deviation among the battery groups G, based on the temperature information of each battery group G transmitted from the M-BMS 300.

In Step S1140, the control unit 400 may determine whether the calculated temperature deviation is greater than a predetermined threshold value. If the result of Step S1140 is 'YES', Step S1150 may be performed.

In Step S1150, the control unit 400 may output a control signal for adjusting the rotation speed of the cooling fan P provided in at least one battery group G among the plurality of battery groups G. The control signal output from the control unit 400 may be transmitted directly or indirectly to the cooling fan P included in the battery group G.

The embodiments of the present disclosure described above are not implemented only by an apparatus and method, but may also be implemented through a program realizing functions corresponding to the configuration of the embodiment of the present disclosure or a recording medium on which the program is recorded. These embodiments may be easily implemented from the embodiments by those skilled in the art.

While the present disclosure has been described by way of embodiments and drawings, the present disclosure is not limited thereto but may be changed and modified in various ways by those skilled in the art within the equivalent scope of the appended claims.

In addition, since the present disclosure described above may be replaced, modified and changed in various ways without departing from the technical idea of the present disclosure by those skilled in the art, the present disclosure is not limited to the above embodiments or the accompanying drawings, but all or some of the embodiments may be selectively combined to make various modifications.

REFERENCE SIGNS

100: energy storage system
200: slave BMS
300: master BMS
400: control unit

What is claimed is:

1. An energy storage system, comprising:
a first battery group having a plurality of sections, which respectively have at least one battery module and at least one cooling fan;
a second battery group including a plurality of battery modules and a plurality of cooling fans;
a third battery group including a plurality of battery modules and a plurality of cooling fans;
at least one first slave battery management system (BMS) coupled to the first battery group to monitor a temperature value of battery modules included in the first battery group for each section and generate first temperature information having the monitored temperature value for each section;
at least one second slave BMS coupled to the second battery group to monitor a temperature value of each battery module included in the second battery group and generate second temperature information having the temperature value of each battery module included in the second battery group;
at least one third slave BMS coupled to the third battery group to monitor a temperature value of each battery module included in the third battery group and generate third temperature information having the temperature value of each battery module included in the third battery group;
a master BMS configured to transmit the first temperature information, the second temperature information and the third temperature information;
a control unit configured to output a first control signal for adjusting a rotation speed of at least one cooling fan provided in at least one of the plurality of sections, based on the first temperature information transmitted from the master BMS,
wherein the control unit is configured to calculate a temperature deviation of the first to third battery groups, based on the first temperature information, the second temperature information and the third temperature information transmitted from the master BMS, and
wherein the control unit is configured to output a second control signal for adjusting a rotation speed of at least one of the plurality of cooling fans provided in each of the first to third battery groups, based on the temperature deviation of the first to third battery groups.

2. The energy storage system according to claim 1,
wherein the control unit calculates a temperature deviation formed at the first battery group, based on the first temperature information transmitted from the master BMS, and
wherein the control unit outputs the first control signal, based on the temperature deviation.

3. The energy storage system according to claim 2,
wherein the temperature deviation is a difference between a maximum temperature value and a minimum temperature value among the temperature values included in the first temperature information.

4. The energy storage system according to claim 3,
wherein the first battery group further includes at least one battery rack,
wherein each of the battery racks includes a plurality of accommodation cases stacked in a vertical direction, and
wherein each of the accommodation cases is provided with at least one battery module and at least one cooling fan.

5. The energy storage system according to claim 4,
wherein the first control signal includes at least one of an acceleration command for a rotation speed of the cooling fan provided in the accommodation case having a battery module from which the maximum temperature value is monitored and a deceleration command for a rotation speed of the cooling fan provided in the accommodation case having a battery module from which the minimum temperature value is monitored.

6. The energy storage system according to claim 1,
wherein the control unit calculates a first average by averaging the temperature values included in the first temperature information, calculates a second average by averaging the temperature values included in the second temperature information, and calculates a third average by averaging the temperature values included in the third temperature information, and
wherein the temperature deviation of the first to third battery groups is a difference between a maximum average and a minimum average of the first to third average.

7. The energy storage system according to claim 6,
wherein the second control signal includes at least one of an acceleration command for at least one of the plurality of cooling fan included in the battery group corresponding to the maximum average and a deceleration command for at least one of the plurality of cooling fan included in the battery group corresponding to the minimum average.

8. A temperature control method for an energy storage system which includes a first battery group having a plurality of battery modules and a plurality of cooling fans, a first slave BMS, a master BMS, a second battery group having a plurality of battery modules and a plurality of cooling fans, a third battery group having a plurality of battery modules and a plurality of cooling fans, at least one second slave BMS coupled to the second battery group, at least one third slave BMS coupled to the third battery group and a control unit, the method comprising:
by the first slave BMS, generating first temperature information having a temperature value of each battery module included in the first battery group;
by the second slave BMS, generating second temperature information having a temperature value of each battery module included in the second battery group;
by the third slave BMS, generating third temperature information having a temperature value of each battery module included in the third battery group;
by the master BMS, transmitting the first temperature information, the second temperature information and the third temperature information to the control unit;
by the control unit, outputting a first control signal for adjusting a rotation speed of at least one of the plurality of cooling fans included in the first battery group, based on the first temperature information transmitted from the master BMS;
by the control unit, calculating a temperature deviation of the first to third battery groups, based on the first temperature information, the second temperature information and the third temperature information, transmitted from the master BMS; and
by the control unit, outputting a second control signal for adjusting a rotation speed of at least one of the plurality of cooling fans included in each of the first to third battery groups, based on the temperature deviation of the first to third battery groups.

* * * * *